US012574193B2

(12) United States Patent
Zhang et al.

(10) Patent No.: US 12,574,193 B2
(45) Date of Patent: Mar. 10, 2026

(54) METHODS AND APPARATUS OF ENHANCED PHYSICAL DOWNLINK CONTROL CHANNEL (PDCCH) CANDIDATE MONITORING

(71) Applicant: Lenovo (Beijing) Limited, Beijing (CN)

(72) Inventors: Yi Zhang, Beijing (CN); Chenxi Zhu, Beijing (CN); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 307 days.

(21) Appl. No.: 18/284,670

(22) PCT Filed: Apr. 1, 2021

(86) PCT No.: PCT/CN2021/084959
§ 371 (c)(1),
(2) Date: Sep. 28, 2023

(87) PCT Pub. No.: WO2022/205318
PCT Pub. Date: Oct. 6, 2022

(65) Prior Publication Data
US 2024/0178977 A1 May 30, 2024

(51) Int. Cl.
*H04L 5/00* (2006.01)
*H04W 72/23* (2023.01)

(52) U.S. Cl.
CPC .......... *H04L 5/0094* (2013.01); *H04L 5/0048* (2013.01); *H04W 72/23* (2023.01)

(58) Field of Classification Search
CPC ..... H04L 5/0094; H04L 5/0048; H04W 72/23
(Continued)

(56) References Cited

U.S. PATENT DOCUMENTS

2020/0052857 A1* 2/2020 Xu ........................ H04W 76/27
2020/0351682 A1 11/2020 Cirik et al.

FOREIGN PATENT DOCUMENTS

CN          106877991 A     6/2017
WO          2019139955 A1   7/2019
(Continued)

OTHER PUBLICATIONS

Qualcomm, "Discussion Summary for mTRP PDCCH Reliability Enhancements", 3GPP, R1-2101838 (Year: 2021).*
(Continued)

*Primary Examiner* — Christopher R Crompton
(74) *Attorney, Agent, or Firm* — FIG. 1 Patents

(57) ABSTRACT

Methods and apparatus of enhanced Physical Downlink Control Channel (PDCCH) candidate monitoring are disclosed. The method includes: receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of linked candidates; determining, by a processor, whether there is a collision between at least one of the linked candidates and a reserved resource; and providing, by the processor, a candidate monitoring scheme in response to a determination that a first candidate of the linked candidates collides with the reserved resource.

20 Claims, 4 Drawing Sheets

```
┌──────────────────────────────────────────────────────────────┐
│                              602                               │
│ transmitting, by a transmitter, configurations of a plurality  │
│ of search space sets that are linked for a Physical Downlink   │
│ Control Channel (PDCCH) transmission with a plurality of       │
│ repetitions; wherein the plurality of repetitions of the PDCCH │
│ are to be transmitted on a plurality of candidates             │
└──────────────────────────────────────────────────────────────┘
                                │
                                ▼
┌──────────────────────────────────────────────────────────────┐
│                              604                               │
│ determining, by a processor, whether there is a collision      │
│ between at least one of the linked candidates and a reserved   │
│ resource                                                       │
└──────────────────────────────────────────────────────────────┘
                                │
                                ▼
┌──────────────────────────────────────────────────────────────┐
│                              606                               │
│ providing, by the processor, a candidate monitoring scheme in  │
│ response to a determination that a first candidate of the      │
│ linked candidates collides with the reserved resource          │
└──────────────────────────────────────────────────────────────┘
                                │
                                ▼
┌──────────────────────────────────────────────────────────────┐
│                              608                               │
│ determining, by the processor, resources for transmission of   │
│ the linked candidates based on the candidate monitoring scheme │
└──────────────────────────────────────────────────────────────┘
```

(58) Field of Classification Search
    USPC ........................................................ 370/329
    See application file for complete search history.

(56)                    References Cited

FOREIGN PATENT DOCUMENTS

WO          2020030981  A1      2/2020
WO          2020162711  A1      8/2020

OTHER PUBLICATIONS

Huawei , et al., "Enhancements on multi-TRP for reliability and robustness in Rel-17", 3GPP TSG RAN WG1 Meeting #104-e, R1-2100209, E-meeting [retrieved Dec. 4, 2023]. Retrieved from the Internet <https://www.3gpp.org/ftp/tsg_ran/WG1_RL1/TSGR1_104-e/Docs>, Jan. 2021, 14 pages.

Huawei , et al., "Enhancements on multi-TRP for reliability and robustness in Rel-17", 3GPP TSG RAN WG1 Meeting #103-e, R1-2007587, E-meeting [retrieved Dec. 4, 2023]. Retrieved from the Internet <https://www.3gpp.org/ftp/tsg_ran/WG1_RL1/TSGR1_103-e/Docs>, Oct. 2020, 12 pages.

Moderator (Qualcomm) , "Discussion Summary for mTRP PDCCH Reliability Enhancements", 3GPP TSG-RAN WG1 Meeting #104-e, R1-2101838, e-Meeting [retrieved Dec. 4, 2023]. Retrieved from the Internet <https://www.3gpp.org/ftp/tsg_ran/WG1_RL1/TSGR1_104-e/Docs>, Jan. 2021, 49 pages.

PCT/CN2021/084959 , "International Preliminary Report on Patentability", PCT Application No. PCT/CN2021/084959, Oct. 12, 2023, 6 pages.

PCT/CN2021/084959 , "International Search Report and Written Opinion", PCT Application No. PCT/CN2021/084959, Jan. 5, 2022, 8 pages.

21933977.7 , "Extended European Search Report", EP Application No. 21933977.7, Nov. 4, 2024, 79 pages.

* cited by examiner

100

104

102

102

104 backhaul          backhaul 104a          backhaul          104b 102a          102b

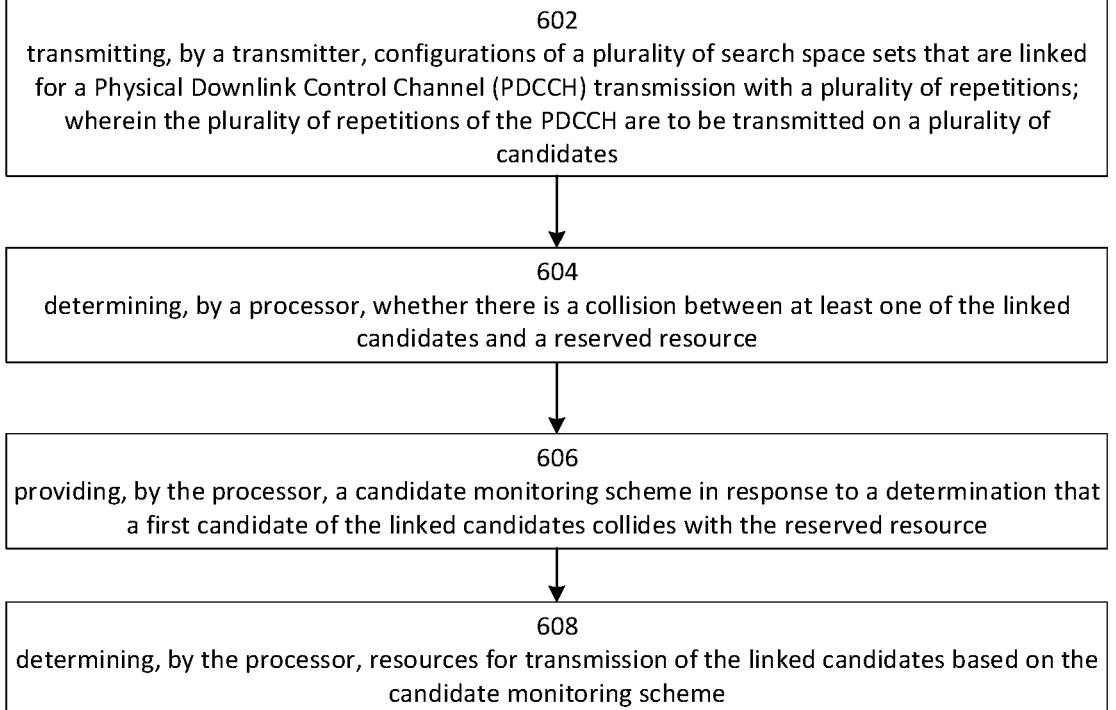

602
transmitting, by a transmitter, configurations of a plurality of search space sets that are linked for a Physical Downlink Control Channel (PDCCH) transmission with a plurality of repetitions; wherein the plurality of repetitions of the PDCCH are to be transmitted on a plurality of candidates 604
determining, by a processor, whether there is a collision between at least one of the linked candidates and a reserved resource 606
providing, by the processor, a candidate monitoring scheme in response to a determination that a first candidate of the linked candidates collides with the reserved resource 608
determining, by the processor, resources for transmission of the linked candidates based on the candidate monitoring scheme

Figure 6

METHODS AND APPARATUS OF ENHANCED PHYSICAL DOWNLINK CONTROL CHANNEL (PDCCH) CANDIDATE MONITORING

FIELD

The subject matter disclosed herein relates generally to wireless communication and more particularly relates to, but not limited to, methods and apparatus of enhanced Physical Downlink Control Channel (PDCCH) candidate monitoring.

BACKGROUND

The following abbreviations and acronyms are herewith defined, at least some of which are referred to within the specification:

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Equipment (UE), Network Equipment (NE), Radio Access Technology (RAT), Receive or Receiver (RX), Transmit or Transmitter (TX), Physical Downlink Control Channel (PDCCH), Enhanced Physical Downlink Control Channel (ePDCCH), Physical Downlink Shared Channel (PDSCH), Physical Uplink Shared Channel (PUSCH), Physical Broadcast Channel (PBCH), Cyclic redundancy check (CRC), Cell-specific Reference Signal (CRS), Common Search Space (CSS), Downlink Control Information (DCI), Frequency Division Multiple Access (FDMA), Identifier (ID), Physical Resource Block (PRB), Resource Block (RB), Resource Element (RE), Radio Network Temporary Identifier (RNTI), Synchronization Signal Block (SSB), Transmission and Reception Point (TRP), Ultra Reliable Low Latency Communications (URLLC), UE-specific Search Space (USS), Frequency Range 1 (FR1), Frequency Range 2 (FR2), Technical Specification (TS), Interruption RNTI (INT-RNTI), Log Likelihood Ratio (LLR), Search Space (SS).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) can be transmitted with multiple repetition from multiple TRPs to improve PDCCH transmission reliability and robustness. Multiple transmissions of the ePDCCH may be transmitted from a same TRP or some different TRPs.

SUMMARY

Methods and apparatus of enhanced PDCCH candidate monitoring are disclosed.

According to a first aspect, there is provided a method, including: receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of linked candidates; determining, by a processor, whether there is a collision between at least one of the linked candidates and a reserved resource; and providing, by the processor, a candidate monitoring scheme in response to a determination that a first candidate of the linked candidates collides with the reserved resource.

According to a second aspect, there is provided a method, including: transmitting, by a transmitter, configurations of a plurality of search space sets that are linked for a Physical Downlink Control Channel (PDCCH) transmission with a plurality of repetitions; wherein the plurality of repetitions of the PDCCH are to be transmitted on a plurality of linked candidates; determining, by a processor, whether there is a collision between at least one of the linked candidates and a reserved resource; providing, by the processor, a candidate monitoring scheme in response to a determination that a first candidate of the linked candidates collides with the reserved resource; and determining, by the processor, resources for transmission of the linked candidates based on the candidate monitoring scheme.

According to a third aspect, there is provided an apparatus, including: a receiver that receives configurations of a plurality of search space sets that are linked for a Physical Downlink Control Channel (PDCCH) transmission with a plurality of repetitions; wherein the plurality of repetitions of the PDCCH are transmitted on a plurality of linked candidates; and a processor that determines whether there is a collision between at least one of the linked candidates and a reserved resource; wherein the processor provides a candidate monitoring scheme in response to a determination that a first candidate of the linked candidates collides with the reserved resource.

According to a fourth aspect, there is provided an apparatus, including: a transmitter that transmits configurations of a plurality of search space sets that are linked for a Physical Downlink Control Channel (PDCCH) transmission with a plurality of repetitions; wherein the plurality of repetitions of the PDCCH are to be transmitted on a plurality of linked candidates; and a processor that determines whether there is a collision between at least one of the linked candidates and a reserved resource; wherein the processor provides a candidate monitoring scheme in response to a determination that a first candidate of the linked candidates collides with the reserved resource; and wherein the processor determines resources for transmission of the linked candidates based on the candidate monitoring scheme.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 6 is a flow chart illustrating steps of enhanced PDCCH candidate monitoring by gNB or NE in accordance with some implementations of the present disclosure.

DETAILED DESCRIPTION

Figure 1:
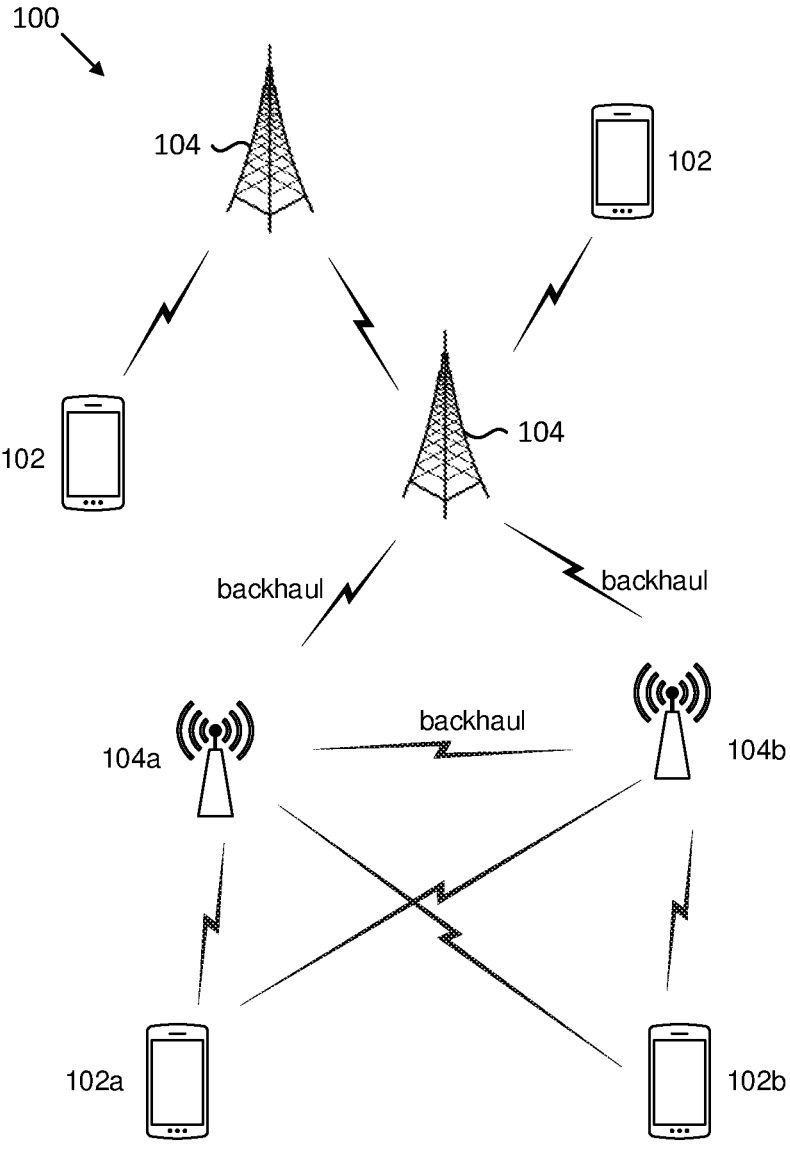
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
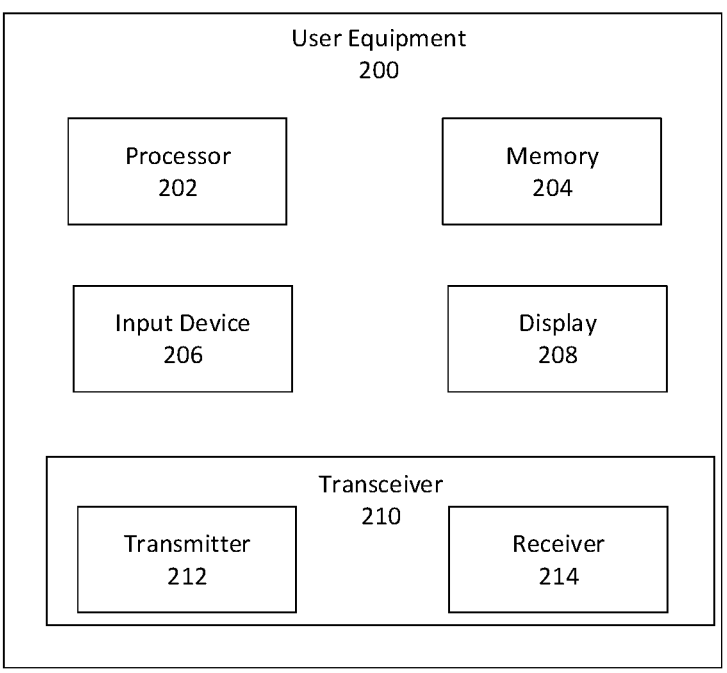
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
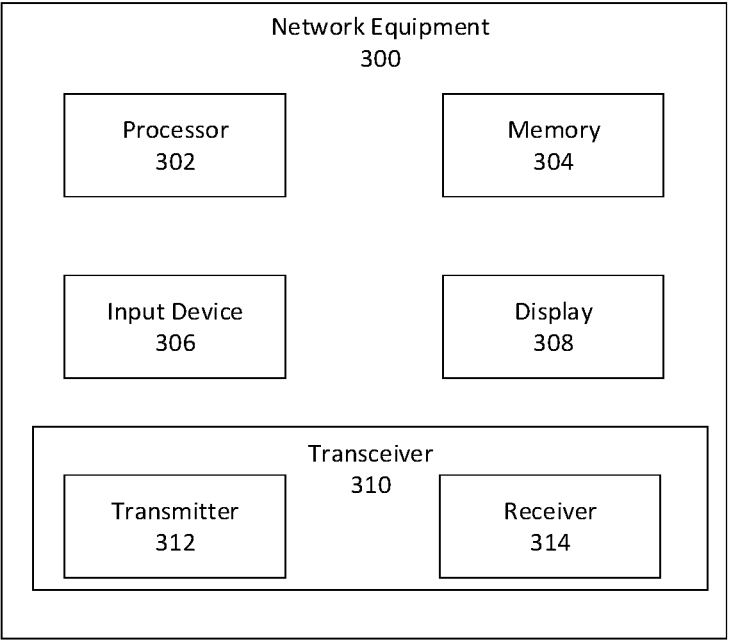
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

UE monitoring behavior is specified in TS (Technical Specification) 38.213 when a PDCCH candidate collides with specific resources. The detailed information is as follows.

If a UE is provided resourceBlocks and symbolsInResourceBlock in RateMatchPattern, or if the UE is additionally provided periodicityAndPattern in RateMatchPattern, the UE can determine a set of RBs in symbols of a slot that are not available for PDSCH reception as described in TS 38.214. If a PDCCH candidate in a slot is mapped to one or more REs that overlap with REs of any RB in the set of RBs in symbols of the slot, the UE does not expect to monitor the PDCCH candidate.

For monitoring of a PDCCH candidate by a UE in a slot or in a span, if the UE has received ssb-PositionsInBurst in SIB1 and has not received ssb-PositionsInBurst in ServingCellConfigCommon for a serving cell, and does not monitor PDCCH candidates in a Type0-PDCCH CSS set, and at least one RE for a PDCCH candidate overlaps with at least one RE of a candidate SS/PBCH block corresponding to a SS/PBCH block index provided by ssb-PositionsInBurst in SIB1, the UE is not required to monitor the PDCCH candidate.

For monitoring of a PDCCH candidate by a UE in a slot, if the UE has received ssb-PositionsInBurst in ServingCellConfigCommon for a serving cell, and does not monitor PDCCH candidates in a Type0-PDCCH CSS set, and at least one RE for a PDCCH candidate overlaps with at least one RE of a candidate SS/PBCH block corresponding to a SS/PBCH block index provided by ssb-PositionsInBurst in ServingCellConfigCommon, the UE is not required to monitor the PDCCH candidate.

If a UE monitors the PDCCH candidate for a Type0-PDCCH CSS set on the serving cell according to a certain procedure described in the TS, the UE may assume that no SS/PBCH block is transmitted in REs used for monitoring the PDCCH candidate on the serving cell.

If at least one RE of a PDCCH candidate for a UE on the serving cell overlaps with at least one RE of lte-CRS-ToMatchAround, or of LTE-CRS-PatternList-r16, the UE is not required to monitor the PDCCH candidate.

If a UE is provided availableRB-SetPerCell-r16, the UE is not required to monitor PDCCH candidates that overlap with any RB from RB sets that are indicated as unavailable for receptions by DCI format 2_0.

No transmission is assumed by UEs for PRBs and OFDM symbols indicated by DCI format 2_1. Thus, the UE will not monitor the PDCCH candidate that overlaps with the indicated resources. The detailed information is as follows.

DCI format 2_1 is used for notifying the PRB(s) and OFDM symbol(s) where UE may assume no transmission is intended for the UE.

The following information is transmitted by means of the DCI format 2_1 with CRC scrambled by INT-RNTI:

Pre-emption indication 1, Pre-emption indication 2, . . . , Pre-emption indication N.

The size of DCI format 2_1 is configurable by higher layers up to 126 bits, according to TS 38.213. Each pre-emption indication is 14 bits.

In summary, according to the current 3GPP specification, when a normal PDCCH candidate collides with reserved resources (or special resources), e.g., reserved resource blocks for PDSCH rate matching, SSB transmission, RB sets indicated as unavailable by DCI format 2_0, reserved RB set indicated by DCI format 2_1 for pre-emption, CRS RE of lte-CRS-ToMatchAround or of LTE-CRS-PatternList-r16, the UE is not expected to monitor the PDCCH candidate.

For enhanced PDCCH in which one DCI may be transmitted with multiple candidates with repetitions from multiple TRPs, two linked search space sets are configured and two candidates from the two linked search space sets are used for one PDCCH detection together. Different UE decoding behaviors are possible for the two linked candidates. When the linked candidate collides with the above mentioned special resources, the UE behavior needs definition. In the disclosure, enhanced UE monitoring behavior is proposed in the case where there is a collision between the linked enhanced PDCCH candidate and the specific resources. These specific resources or reserved resources are configured or indicated as being not available for PDCCH transmission.

The reserved resources (or specific resources) may be one of the following resources:

1. Reserved resources by resourceBlocks and symbolsIn-ResourceBlock in RateMatchPattern;
2. Resources for SSB transmission;
3. Any RB from RB sets that are indicated as unavailable for receptions by DCI format 2_0;
4. RE of lte-CRS-ToMatchAround, or of LTE-CRS-PatternList-r16; and
5. PRB(s) and OFDM symbol(s) indicated by DCI format 2_1 where UE may assume that no transmission is intended for the UE.

The reserved resources (or specific resources) may also be resources other those mentioned above, and may be configured or indicated as being not available for PDCCH transmission.

Figure 4:
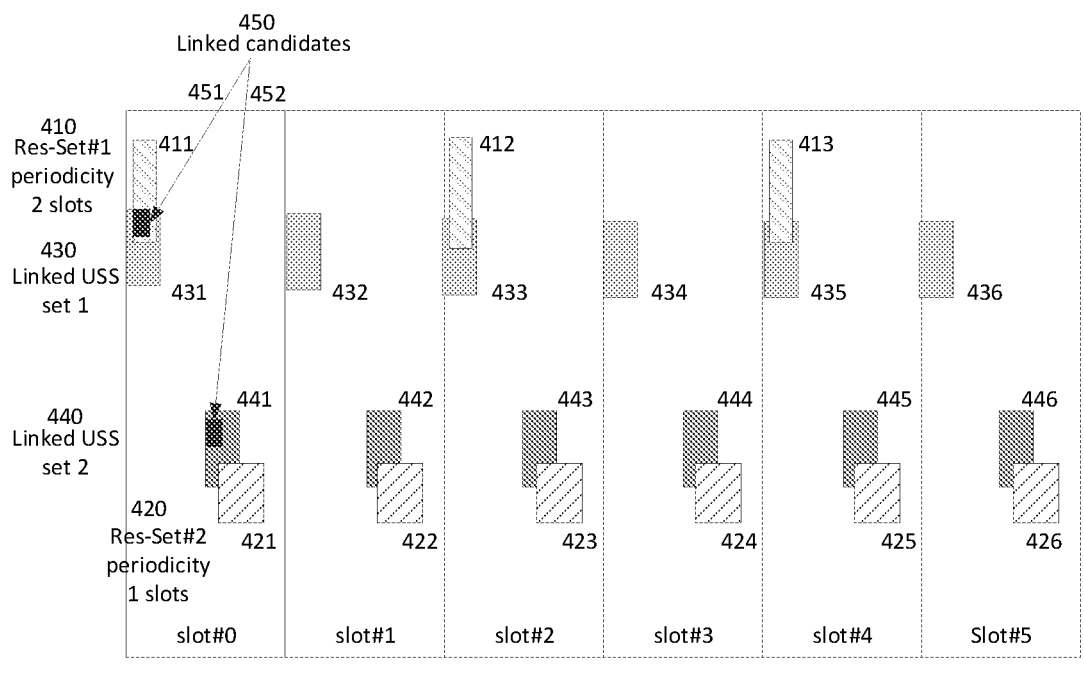
FIG. 4 is a schematic diagram illustrating an example of collision of a linked enhanced PDCCH candidate with reserved resource for PDSCH rate matching in accordance with some implementations of the present disclosure.

FIG. 4 is a schematic diagram illustrating an example of collision of a linked ePDCCH candidate with reserved resource for PDSCH rate matching in accordance with some implementations of the present disclosure. In FIG. 4, linked ePDCCH candidates 450 include a first candidate 451 from the linked UE-specific search space (USS) set 1 430 (e.g., 431-436) and a second candidate 452 from the linked USS set 2 440 (e.g., 441-446), respectively. Two sets of reserved resources for PDSCH rate matching are shown as Res-Set #1 410 (e.g., 411-413) with a periodicity of 2 slots and Res-Set #2 420 (e.g., 421-426) with a periodicity of 1 slot. The linked ePDCCH candidate 451 in the linked USS set 1 431 collides with the Res-Set #1 411 for PDSCH rate matching.

For ePDCCH transmission, two linked search space sets are configured and two candidates from the linked search space sets are used for one PDCCH detection together. The decoding behavior for the two linked candidates (e.g., linked candidates 451 and 452 in FIG. 4) is related. In the disclosure, the decoding behavior is proposed when the linked ePDCCH candidate collides with specific resources. In detail, three possible enhanced decoding behaviors (or candidate monitoring schemes) are proposed as follows.

Fallback Decoding Behavior with Individual Detection for Two Linked Candidates

For the fallback decoding behavior, the UE is not expected to monitor the ePDCCH candidate with collision, i.e., the ePDCCH candidate of the linked candidates that collides with any of the above mentioned specific resources; and the UE will monitor the other ePDCCH candidate without collision with individual detection, i.e., without soft combining.

The fallback decoding behavior or, fallback detection scheme, is used for the detection of the linked PDCCH candidates when one of the linked candidates collides with the special resources mentioned earlier. The fallback detection scheme is based on individual detection for the candidate without collision, where LLR is computed for the candidate without collision and no LLR combination is performed.

For easy comparison, the UE decoding behaviors for three different scenarios are shown in Table 1, Table 2 and Table 3 below, respectively. Table 1 illustrates the four possible UE decoding behaviors for ePDCCH detection when there is no collision between the ePDCCH candidates and the specific resources. Table 2 illustrates the four possible UE decoding behaviors for ePDCCH detection when there is a collision between the first candidate of the linked candidates and the specific resource; and Table 3 illustrates the four possible UE decoding behaviors for ePDCCH detection when there is a collision between the second candidate of the linked candidates and the specific resource. The fallback detection scheme is illustrated in Table 2 and Table 3.

As shown in Table 1, for UE decoding behavior 1, the UE performs only one polar decoding based on combined LLR; for UE decoding behavior 2, the UE performs two separate polar decoding, each based on LLR for one candidate individually; for UE decoding behavior 3, the UE performs a first polar decoding based on LLR for the first candidate and a second polar decoding based on combined LLR; and for UE decoding behavior 4, the UE performs a first polar decoding based on LLR for the first candidate, a second polar decoding based on LLR for the second candidate, and a third polar decoding based on combined LLR.

Comparing Table 2 with Table 1, since there is a collision on the first candidate, no LLR computation or polar decoding is performed for the first candidate in all four decoding behaviors; and the UE decoding behaviors for the second candidates are changed in decoding behaviors 1, 3 and 4. For example, for decoding behavior 1, LLR computation corresponding to polar decoding is changed from combination LLR to LLR for the second candidate. That is, the UE decodes the second candidate individually while not monitoring the first candidate (in this case, the candidate with collision).

Comparing Table 3 with Table 1, since there is a collision on the second candidate, no LLR computation or polar decoding is performed for the second candidate in all four decoding behaviors; and the UE decoding behavior for the first candidate is changed for decoding behavior 1. In detail, polar decoding is changed from no decoding to one decoding based on LLR for the first candidate. That is, the UE decodes the first candidate individually while not monitoring the second candidate (in this case, the candidate with collision).

TABLE 1

| | First candidate (No collision) | Second candidate (No collision) |
|---|---|---|
| UE decoding behavior 1 without collision | LLR computation for the first candidate<br>No Polar decoding | LLR computation for the second candidate and LLR combination for both candidates<br>One Polar decoding based on combined LLR |
| UE decoding behavior 2 without collision | LLR computation for the first candidate<br>One Polar decoding based on LLR for the first candidate | LLR computation for the second candidate<br>One Polar decoding based on LLR for the second candidate |
| UE decoding behavior 3 without collision | LLR computation for the first candidate<br>One Polar decoding based on LLR for the first candidate | LLR computation for the second candidate and LLR combination for both candidates<br>One Polar decoding based on combined LLR |
| UE decoding behavior 4 without collision | LLR computation for the first candidate<br>One Polar decoding based on LLR for the first candidate | LLR computation for the second candidate and LLR combination for both candidates<br>Two Polar decoding with one Polar decoding based on LLR for the second candidate and another polar decoding based on combined LLR |

TABLE 2

| | First candidate (with collision) | Second candidate (without collision) |
|---|---|---|
| UE decoding behavior 1 | No LLR computation<br>No Polar decoding | LLR computation for the second candidate<br>One Polar decoding based on LLR for the second candidate |
| UE decoding behavior 2 | No LLR computation<br>No Polar decoding | LLR computation for the second candidate<br>One Polar decoding based on LLR for the second candidate |
| UE decoding behavior 3 | No LLR computation<br>No Polar decoding | LLR computation for the second candidate<br>One Polar decoding based on LLR for the second candidate |
| UE decoding behavior 4 | No LLR computation<br>No Polar decoding | LLR computation for the second candidate<br>One Polar decoding based on LLR for the second candidate |

40

TABLE 3

| | First candidate (without collision) | Second candidate (with collision) |
|---|---|---|
| UE decoding behavior 1 | LLR computation for the first candidate<br>One Polar decoding based on LLR for the first candidate | No LLR computation<br>No Polar decoding |
| UE decoding behavior 2 | LLR computation for the first candidate<br>One Polar decoding based on LLR for the first candidate | No LLR computation<br>No Polar decoding |
| UE decoding behavior 3 | LLR computation for the first candidate<br>One Polar decoding based on LLR for the first candidate | No LLR computation<br>No Polar decoding |
| UE decoding behavior 4 | LLR computation for the first candidate<br>One Polar decoding based on LLR for the first candidate | No LLR computation<br>No Polar decoding |

Corresponding to this fallback detection scheme, for blind detection capability limit checking and ePDCCH candidate overbooking, the counting number for blind detection corresponding to monitoring of the candidate without collision may be configured as one; and the counting number for blind detection corresponding to monitoring of the candidate with collision may be configured as zero.

Both Linked Candidates not Monitored

The fallback detection scheme is efficient in resource usage since the candidate without collision may be used for ePDCCH transmission. However, this may result in performance degradation since the PDCCH transmission with only one candidate cannot provide enough reliability. If the detection is unsuccessful, it will not only cause a large delay but also result in resource waste on account of PDSCH/ PUSCH transmission and additional detection complexity for PDCCH transmission with one candidate. Furthermore, it will provide more realization complexity as normal detection is used for candidates without collision while fallback detection is used for candidates with collision in the same monitoring occasion.

Thus, a simple scheme may be used, i.e., both linked candidates are not monitored. In other words, the UE is not expected to monitor any one of the linked candidates when there is a collision between one of the linked candidates and reserved resources. In this candidate monitoring scheme, the gNB will not transmit ePDCCH on any of the linked candidates.

Monitoring Both Linked Candidates

In some special cases, there may be an urgent requirement for the transmission of ePDCCH and the corresponding scheduled data. Thus, an enhanced UE monitoring behavior is provided to support ePDCCH transmission with high priority relative to certain transmissions on reserved resources. In this candidate monitoring scheme, the UE will monitor both linked candidates even when there is a collision between the ePDCCH candidates and reserved resources. That is, the UE may perform the same monitoring behaviors for both collision and non-collision cases. The base station, or gNB, will transmit ePDCCH candidate with collision on the reserved resource, and will not transmit data on the reserved resource.

Since resources may be reserved for special targets, in usual situations, it is better not to use them for ePDCCH transmission. Thus, the fallback detection scheme and the scheme of not monitoring both linked candidates may be used in usual situations. The enhanced behavior of monitoring both linked candidates may be optionally configured to be used for special requirements. One possible application scenario may be in the case of collision with reserved resources for URLLC data transmission, e.g., item 1 of the listed five specific resources. However, this scheme is not applicable for collision with the reserved resources for SSB transmission and CRS transmission.

As another application scenario, this enhanced UE monitoring scheme may be used for FR2 when transmissions on the reserve resource and ePDCCH may be received simultaneously, e.g., receiving with multiple panels and different beams. In such cases, the ePDCCH and data can be transmitted simultaneously on the colliding or overlapping reserved resource; and the UE will monitor the ePDCCH candidate and receive the data simultaneously on the colliding or overlapping reserved resource.

The UE may be configured to monitor both linked candidates in collision cases with the reception of a configuration signaling for monitoring the linked candidates from the gNB.

Figure 5:
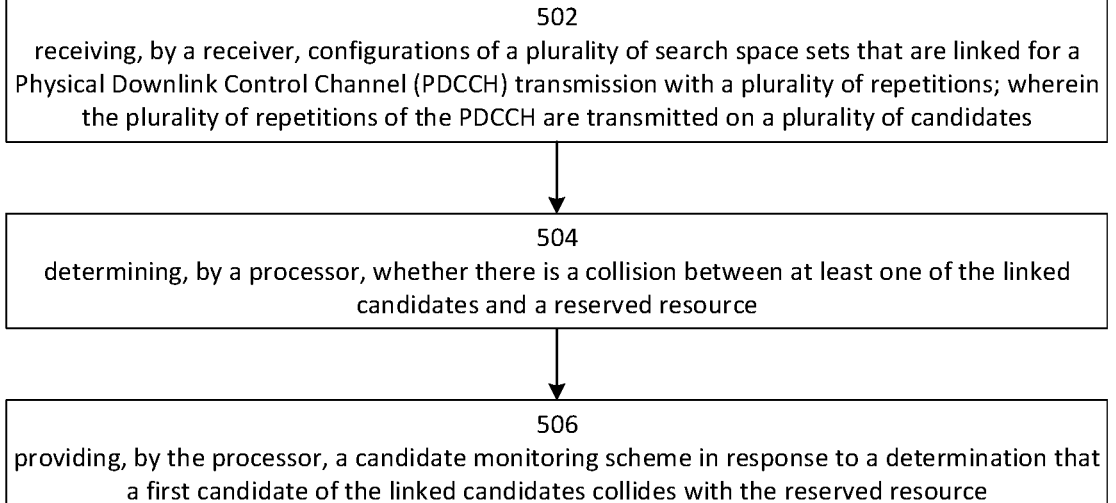
FIG. 5 is a flow chart illustrating steps of enhanced PDCCH candidate monitoring by UE in accordance with some implementations of the present disclosure.

FIG. 5 is a flow chart illustrating steps of enhanced PDCCH candidate monitoring by UE 200 in accordance with some implementations of the present disclosure.

At step 502, the receiver 214 of UE 200 receives configurations of a plurality of search space sets that are linked for a Physical Downlink Control Channel (PDCCH) transmission with a plurality of repetitions; wherein the plurality of repetitions of the PDCCH are transmitted on a plurality of linked candidates.

At step 504, the processor 202 of UE 200 determines whether there is a collision between at least one of the linked candidates and a reserved resource.

At step 506, the processor 202 of UE 200 provides a candidate monitoring scheme in response to a determination that a first candidate of the linked candidates collides with the reserved resource.

FIG. 6 is a flow chart illustrating steps of enhanced PDCCH candidate monitoring by gNB or NE 300 in accordance with some implementations of the present disclosure.

At step 602, the transmitter 312 of NE 300 transmits configurations of a plurality of search space sets that are linked for a Physical Downlink Control Channel (PDCCH) transmission with a plurality of repetitions; wherein the plurality of repetitions of the PDCCH are to be transmitted on a plurality of linked candidates.

At step 604, the processor 302 of NE 300 determines whether there is a collision between at least one of the linked candidates and a reserved resource.

At step 606, the processor 302 of NE 300 provides a candidate monitoring scheme in response to a determination that a first candidate of the linked candidates collides with the reserved resource.

At step 608, the processor 302 of NE 300 determines resources for transmission of the linked candidates based on the candidate monitoring scheme.

In one aspect, some items as examples of the disclosure concerning a method of a UE or remote device may be summarized as follows:

1. A method, comprising:

receiving, by a receiver, configurations of a plurality of search space sets that are linked for a Physical Downlink Control Channel (PDCCH) transmission with a plurality of repetitions; wherein the plurality of repetitions of the PDCCH are transmitted on a plurality of linked candidates;

determining, by a processor, whether there is a collision between at least one of the linked candidates and a reserved resource; and providing, by the processor, a candidate monitoring scheme in response to a determination that a first candidate of the linked candidates collides with the reserved resource.

2. The method of item 1, wherein the reserved resource is configured or indicated as being not available for PDCCH transmission.

3. The method of item 1, wherein the candidate monitoring scheme comprises not monitoring the first candidate.

4. The method of item 3, wherein the candidate monitoring scheme further comprises individually monitoring a second candidate of the linked candidates which is linked with the first candidate and does not collide with the reserved resource.

5. The method of item 3, wherein the candidate monitoring scheme further comprises not monitoring a second candidate of the linked candidates which is linked with the first candidate, irrespective of whether the second candidate collides with the reserved resource.

6. The method of item 4, wherein a counting number for blind detection corresponding to monitoring of the second candidate is configured as one.

7. The method of item 4, wherein a counting number for blind detection corresponding to monitoring of the first candidate is configured as zero.

8. The method of item 1, further comprising: receiving a configuration signaling for monitoring the linked candidates.

9. The method of item 8, wherein the candidate monitoring scheme comprises monitoring all of the linked candidates, irrespective of whether there is a collision between at least one of the linked candidates and the reserved resource.

10. The method of item 1, wherein the reserved resource comprises a reserved resource block configured in a rate matching pattern.

11. The method of item 1, wherein the reserved resource comprises a resource for SSB transmission.

12. The method of item 1, wherein the reserved resource comprises a resource for CRS transmission.

13. The method of item 1, wherein the reserved resource comprises a resource indicated by DCI format 2_0.

14. The method of item 1, wherein the reserved resource comprises a resource indicated by DCI format 2_1.

In another aspect, some items as examples of the disclosure concerning a method of a NE or gNB may be summarized as follows:

15. A method, comprising:

transmitting, by a transmitter, configurations of a plurality of search space sets that are linked for a Physical Downlink Control Channel (PDCCH) transmission with a plurality of repetitions; wherein the plurality of repetitions of the PDCCH are transmitted on a plurality of linked candidates;

determining, by a processor, whether there is a collision between at least one of the linked candidates and a reserved resource;

providing, by the processor, a candidate monitoring scheme in response to a determination that a first candidate of the linked candidates collides with the reserved resource; and determining, by the processor, resources for transmission of the linked candidates based on the candidate monitoring scheme.

16. The method of item 15, wherein the reserved resource is configured or indicated as being not available for PDCCH transmission.

17. The method of item 15, wherein the candidate monitoring scheme comprises not monitoring the first candidate.

18. The method of item 17, wherein the candidate monitoring scheme further comprises individually monitoring a second candidate of the linked candidates which is linked with the first candidate and does not collide with the reserved resource.

19. The method of item 17, wherein the candidate monitoring scheme further comprises not monitoring a second candidate of the linked candidates which is linked with the first candidate, irrespective of whether the second candidate collides with the reserved resource.

20. The method of item 18, wherein a counting number for blind detection corresponding to monitoring of the second candidate is configured as one.

21. The method of item 18, wherein a counting number for blind detection corresponding to monitoring of the first candidate is configured as zero.

22. The method of item 15, further comprising: transmitting a configuration signaling for monitoring the linked candidates.

23. The method of item 22, wherein the candidate monitoring scheme comprises monitoring all of the linked candidates, irrespective of whether there is a collision between at least one of the linked candidates and the reserved resource.

24. The method of item 15, wherein the reserved resource comprises a reserved resource block configured in a rate matching pattern.

25. The method of item 15, wherein the reserved resource comprises a resource for SSB transmission.

26. The method of item 15, wherein the reserved resource comprises a resource for CRS transmission.

27. The method of item 15, wherein the reserved resource comprises a resource indicated by DCI format 2_0.

28. The method of item 15, wherein the reserved resource comprises a resource indicated by DCI format 2_1.

In a further aspect, some items as examples of the disclosure concerning a UE or remote device may be summarized as follows:

29. An apparatus, comprising:

a receiver that receives configurations of a plurality of search space sets that are linked for a Physical Downlink Control Channel (PDCCH) transmission with a plurality of repetitions; wherein the plurality of repetitions of the PDCCH are transmitted on a plurality of linked candidates; and a processor that determines whether there is a collision between at least one of the linked candidates and a reserved resource;

wherein the processor provides a candidate monitoring scheme in response to a determination that a first candidate of the linked candidates collides with the reserved resource.

30. The apparatus of item 29, wherein the reserved resource is configured or indicated as being not available for PDCCH transmission.

31. The apparatus of item 29, wherein the candidate monitoring scheme comprises not monitoring the first candidate.

32. The apparatus of item 31, wherein the candidate monitoring scheme further comprises individually monitoring a second candidate of the linked candidates which is linked with the first candidate and does not collide with the reserved resource.

33. The apparatus of item 31, wherein the candidate monitoring scheme further comprises not monitoring a second candidate of the linked candidates which is linked with the first candidate, irrespective of whether the second candidate collides with the reserved resource.

34. The apparatus of item 32, wherein a counting number for blind detection corresponding to monitoring of the second candidate is configured as one.

35. The apparatus of item 32, wherein a counting number for blind detection corresponding to monitoring of the first candidate is configured as zero.

36. The apparatus of item 29, wherein the receiver further receives a configuration signaling for monitoring the linked candidates.

37. The apparatus of item 36, wherein the candidate monitoring scheme comprises monitoring all of the linked candidates, irrespective of whether there is a collision between at least one of the linked candidates and the reserved resource.

38. The apparatus of item 29, wherein the reserved resource comprises a reserved resource block configured in a rate matching pattern.

39. The apparatus of item 29, wherein the reserved resource comprises a resource for SSB transmission.

40. The apparatus of item 29, wherein the reserved resource comprises a resource for CRS transmission.

41. The apparatus of item 29, wherein the reserved resource comprises a resource indicated by DCI format 2_0.

42. The apparatus of item 29, wherein the reserved resource comprises a resource indicated by DCI format 2_1.

In a yet further aspect, some items as examples of the disclosure concerning a NE or gNB may be summarized as follows:

43. An apparatus, comprising:

a transmitter that transmits configurations of a plurality of search space sets that are linked for a Physical Downlink Control Channel (PDCCH) transmission with a plurality of repetitions; wherein the plurality of repetitions of the PDCCH are transmitted on a plurality of linked candidates; and a processor that determines whether there is a collision between at least one of the linked candidates and a reserved resource;

wherein the processor provides a candidate monitoring scheme in response to a determination that a first candidate of the linked candidates collides with the reserved resource; and wherein the processor determines resources for transmission of the linked candidates based on the candidate monitoring scheme.

44. The apparatus of item 43, wherein the reserved resource is configured or indicated as being not available for PDCCH transmission.

45. The apparatus of item 43, wherein the candidate monitoring scheme comprises not monitoring the first candidate.

46. The apparatus of item 45, wherein the candidate monitoring scheme further comprises individually monitoring a second candidate of the linked candidates which is linked with the first candidate and does not collide with the reserved resource.

47. The apparatus of item 45, wherein the candidate monitoring scheme further comprises not monitoring a second candidate of the linked candidates which is linked with the first candidate, irrespective of whether the second candidate collides with the reserved resource.

48. The apparatus of item 46, wherein a counting number for blind detection corresponding to monitoring of the second candidate is configured as one.

49. The apparatus of item 46, wherein a counting number for blind detection corresponding to monitoring of the first candidate is configured as zero.

50. The apparatus of item 43, wherein the transmitter further transmits a configuration signaling for monitoring the linked candidates.

51. The apparatus of item 50, wherein the candidate monitoring scheme comprises monitoring all of the linked candidates, irrespective of whether there is a collision between at least one of the linked candidates and the reserved resource.

52. The apparatus of item 43, wherein the reserved resource comprises a reserved resource block configured in a rate matching pattern.

53. The apparatus of item 43, wherein the reserved resource comprises a resource for SSB transmission.

54. The apparatus of item 43, wherein the reserved resource comprises a resource for CRS transmission.

55. The apparatus of item 43, wherein the reserved resource comprises a resource indicated by DCI format 2_0.

56. The apparatus of item 43, wherein the reserved resource comprises a resource indicated by DCI format 2_1.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE) for wireless communication, comprising:

at least one memory; and at least one processor coupled with the at least one memory and configured to cause the UE to:

receive configurations of a plurality of search space sets that are linked for a Physical Downlink Control Channel (PDCCH) transmission with a plurality of repetitions, the plurality of repetitions of the PDCCH transmitted on a plurality of linked candidates;

determine whether there is a collision between at least one of the linked candidates and a reserved resource; and provide a candidate monitoring scheme in response to a determination that a first linked candidate of the linked candidates collides with the reserved resource, the candidate monitoring scheme comprising not monitoring the first linked candidate.

2. The UE of claim 1, wherein the reserved resource is one or more of configured or indicated as being not available for PDCCH transmission.

3. The UE of claim 1, wherein the candidate monitoring scheme further comprises individually monitoring a second linked candidate of the linked candidates which is linked with the first linked candidate and does not collide with the reserved resource.

4. The UE of claim 1, wherein the candidate monitoring scheme further comprises not monitoring a second linked candidate of the linked candidates which is linked with the first linked candidate, irrespective of whether the second linked candidate collides with the reserved resource.

5. The UE of claim 3, wherein a counting number for blind detection corresponding to monitoring of the second linked candidate is configured as one.

6. The UE of claim 3, wherein a counting number for blind detection corresponding to monitoring of the first linked candidate is configured as zero.

7. The UE of claim 1, wherein the at least one processor is configured to receive a configuration signaling for monitoring the linked candidates.

8. The UE of claim 7, wherein the candidate monitoring scheme comprises monitoring all of the linked candidates, irrespective of whether there is a collision between at least one of the linked candidates and the reserved resource.

9. The UE of claim 1, wherein the reserved resource comprises a reserved resource block configured in a rate matching pattern.

10. The UE of claim 1, wherein the reserved resource comprises a resource for Synchronization Signal Block (SSB) transmission.

11. The UE of claim 1, wherein the reserved resource comprises a resource for Cell-specific Reference Signal (CRS) transmission.

12. The UE of claim 1, wherein the reserved resource comprises a resource indicated by Downlink Control Information (DCI) format 2_0.

13. The UE of claim 1, wherein the reserved resource comprises a resource indicated by Downlink Control Information (DCI) format 2_1.

14. A base station for wireless communication, comprising:

at least one memory; and at least one processor coupled with the at least one memory and configured to cause the base station to:

transmit configurations of a plurality of search space sets that are linked for a Physical Downlink Control Channel (PDCCH) transmission with a plurality of repetitions, the plurality of repetitions of the PDCCH transmitted on a plurality of linked candidates;

determine whether there is a collision between at least one of the linked candidates and a reserved resource;

provide a candidate monitoring scheme in response to a determination that a first linked candidate of the linked candidates collides with the reserved resource, the candidate monitoring scheme comprising not monitoring the first linked candidate; and determine resources for transmission of the linked candidates based on the candidate monitoring scheme.

15. A processor for wireless communication, comprising:

at least one controller coupled with at least one memory and configured to cause the processor to:

receive configurations of a plurality of search space sets that are linked for a Physical Downlink Control Channel (PDCCH) transmission with a plurality of repetitions, the plurality of repetitions of the PDCCH transmitted on a plurality of linked candidates;

determine whether there is a collision between at least one of the linked candidates and a reserved resource; and provide a candidate monitoring scheme in response to a determination that a first linked candidate of the linked candidates collides with the reserved resource, the candidate monitoring scheme comprising not monitoring the first linked candidate.

16. The processor of claim 15, wherein the reserved resource is one or more of configured or indicated as being not available for PDCCH transmission.

17. The processor of claim 15, wherein the candidate monitoring scheme further comprises individually monitoring a second linked candidate of the linked candidates which is linked with the first linked candidate and does not collide with the reserved resource.

18. A method performed by a user equipment (UE), the method comprising:

receiving configurations of a plurality of search space sets that are linked for a Physical Downlink Control Channel (PDCCH) transmission with a plurality of repetitions, the plurality of repetitions of the PDCCH transmitted on a plurality of linked candidates;

determining whether there is a collision between at least one of the linked candidates and a reserved resource; and providing a candidate monitoring scheme in response to a determination that a first candidate of the linked candidates collides with the reserved resource, the candidate monitoring scheme comprising not monitoring the first linked candidate.

19. The base station of claim 14, wherein the candidate monitoring scheme further comprises individually monitoring a second linked candidate of the linked candidates which is linked with the first linked candidate and does not collide with the reserved resource.

20. The method of claim 18, wherein the candidate monitoring scheme further comprises individually monitoring a second linked candidate of the linked candidates which is linked with the first linked candidate and does not collide with the reserved resource.

\* \* \* \* \*